Patented July 30, 1940

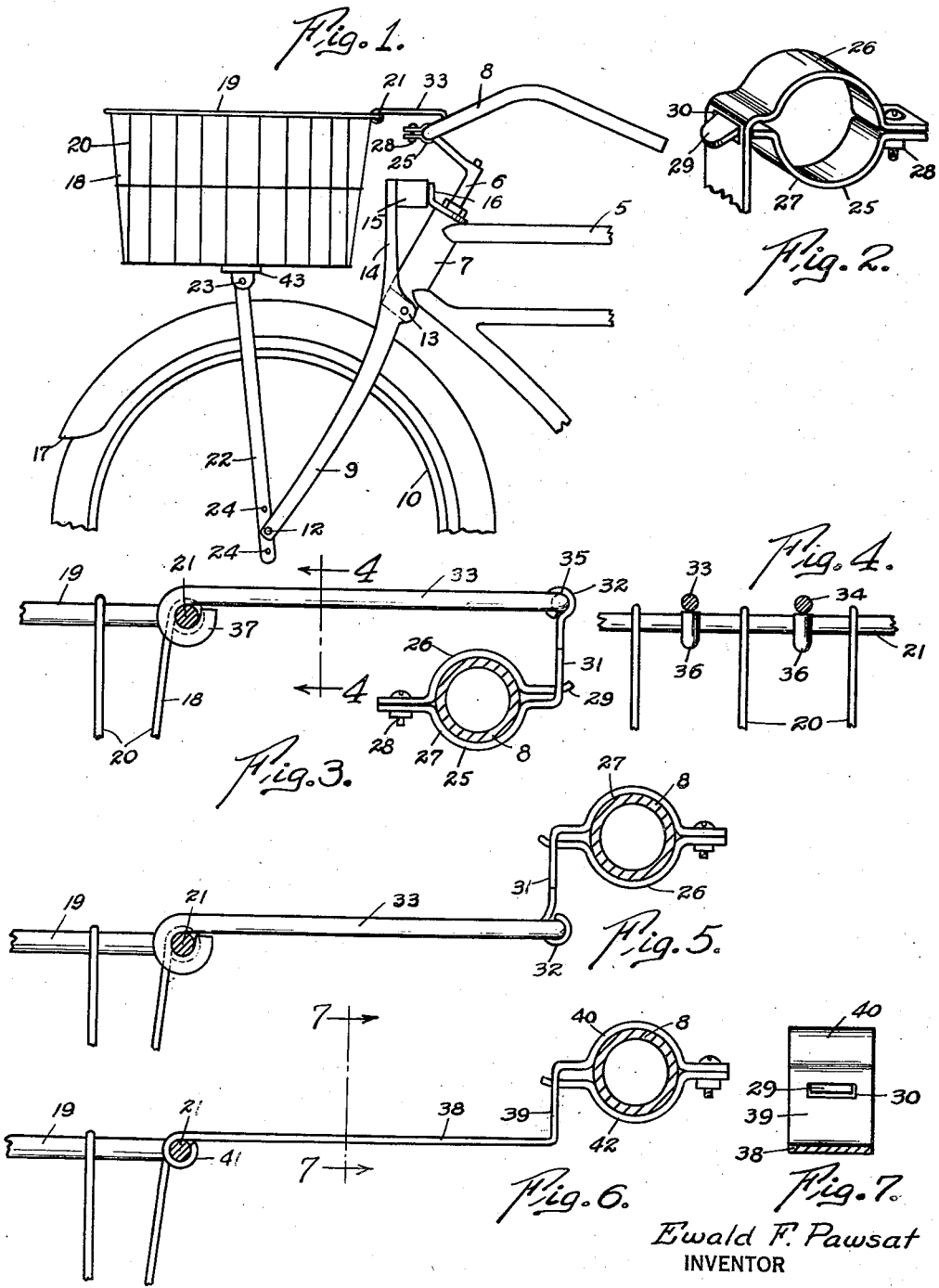

2,209,846

UNITED STATES PATENT OFFICE 2,209,846

CARRIER MOUNTING

Ewald F. Pawsat, Maysville, Ky., assignor to Wald Mfg. Co., Inc., Maysville, Ky., a corporation of Kentucky Application March 28, 1938, Serial No. 198,453

2 Claims. (Cl. 224—36)

This invention relates to means for mounting a basket or carrier upon a bicycle or similar vehicle.

An object of the invention is to provide a simple, inexpensive and effective means for the mounting of a basket or carrier of the character referred to, and arranged so as to prevent severe movement of a character tending to displace or inflict injury upon articles transported in the basket or carrier.

Another object of the invention is to provide a novel form of mounting whereby a bicycle or similar vehicle may be equipped with a basket or carrier with due regard to adjustment and proper fitting so as to enhance the appearance and efficiency of the structure.

A further object of the invention is to provide a carrier or basket mounting which will effectively distribute and absorb the shock and movement incident to bicycle travel, thereby to promote smooth and quiet operation of the vehicle with resultant protection against injury of articles transported.

The foregoing and other objects are attained by the means described herein and disclosed in the accompanying drawing, in which:

Fig. 1 is a fragmentary elevational view of a bicycle or similar vehicle, showing the device of the invention applied thereto.

Fig. 2 is a fragmental perspective view showing in detail a clamp construction forming part of the invention.

Fig. 3 is an enlarged fragmental cross-sectional view taken on a vertical plane passing through the handle bar of the vehicle shown in Fig. 1.

Fig. 4 is a fragmental cross-sectional view taken on line 4—4 of Fig. 3.

Fig. 5 is a view similar to Fig. 3, showing the mounting in a reversed position of adjustment.

Fig. 6 is a view similar to Fig. 5, disclosing a modification.

Fig 7 is a cross-sectional view taken on line 7—7 of Fig. 6.

With reference to the accompanying drawing, 5 indicates the frame of a bicycle or similar vehicle, having a steering post 6 and housing 7 therefor, and a handle bar 8. As will be understood the type of vehicle illustrated is provided with a fork 9 supporting the wheel 10 upon axle 12, said fork being pivoted at 13 upon the steering post or some movable part thereof, so as to move with the steering post and handle bars 8 as the vehicle is directed along its course. Above the pivot 13 is an upwardly extending pair of arms 14, which may be integral with the fork.

Any suitable type of shock absorber indicated conventionally at 15, may be interposed between the arms 14 and a bracket 16 which is movable with the steering post 6. All of the foregoing is known structure and needs not therefore be described in greater detail. The character 17 indicates the fender of the vehicle.

A suitable basket or carrier to be applied to the bicycle is indicated generally by the character 18, and as is customary, such basket or carrier may be constructed of wire. The basket or carrier preferably is rectangular and comprises a continuous circumferential main frame element 19, formed of heavy wire or rod stock from which suitable auxiliary wires may depend to complete the basket structure. It should be noted that the rear transverse run 21 of the frame element 19 is substantially straight, so as to maintain the rectangular character of the basket or carrier as a whole. As will be understood, the main frame element is located, preferably, at the top of the basket or carrier and defines the mouth and the shape thereof.

The basket or carrier is adapted to be supported upon the bicycle forwardly of the handle bars, as clearly indicated in Fig. 1. To this end, there is provided a brace 22, or a pair of such braces, pivoted as at 23 to the bottom of the basket for shiftably supporting the weight thereof. The lower end of the brace or braces 22 of Figs. 1 to 5 inclusive, may be fixedly supported by means of the fork 9 or the axle 12 which extends between the arms of the fork. A series of apertures 24 may be provided at the lower end of each brace for the purpose of varying the elevation of the basket upon the bicycle.

With reference now to Fig. 3, the character 25 indicates generally a clamp to be fixed upon the handle bar 8, and adapted, through suitable connecting means to support the rear upper edge or run 21 of the basket. The clamp may be constituted of a pair of half cylindrical clamp members 26 and 27, to be bolted together or otherwise connected as indicated at 28. Opposite the connection 28, the clamp member 26 may be provided with a tongue 29 which enters an aperture 30 (Fig. 7) provided in the angularly disposed extension 31 of the other clamp member 27. It should be noted that the extension 31 is disposed substantialy at right angles to a plane passing horizontally through the clamp and transversely of the securing means 28. The free end of the angularly disposed extension 31 may be developed into a hinge member or eye 32.

It should be noted that the hinge member or eye 32 may be disposed above a handle bar 8 as illustrated in Fig. 3, or below the handle bar, as in Fig. 5, by merely rotating the entire clamp about the handle bar. In this manner, adjustments may be made for the accommodation of baskets placed at various elevations upon the vehicle, and various adjustments may be made for disposition of the basket to various positions forwardly of the shock absorber and the handle bars. A variety of adjustments are obtainable by reason of the construction just mentioned, and by reason of the fact that the clamp may be placed upon the handle bar in a reversed position; for example in Fig. 3, the clamp may be removed from the handle bar and placed thereon with the upstanding extension 31 disposed to the left of the handle bar 8 rather than to the right thereof as shown, with the angularly disposed extension 31 directed upwardly. The mounting accordingly is adaptable to practically any form of bicycle construction and makes it possible to mount various types of baskets or carriers regardless of the degree of forward extension of the shock absorbing means employed. On bicycles having no shock absorbing front fork, it may be desirable to dispose the mounting means in the manner of Fig. 3, which brings the basket relatively close to the handle bar.

As will be clearly understood, the connection between the eye 32 of the clamp, and the transverse rod or wire 21 of the basket may be effected by means of a U-shaped wire or rod having legs 33 and 34 connected by a transverse connecting portion 35 which is hingedly received by the eye 32. The legs 33 and 34 preferably are arranged in spaced parallelism and the free forward end of each leg may be turned or developed to furnish hinged members or eyes 37 to embrace the part 21 of the basket or carrier, as shown. The connection just mentioned furnishes a hinge, as does also the connection at 35—32.

Attention is now directed to the modification shown in Fig. 6, wherein the support arm 38, corresponding to the legs 33 and 34 of the U-shaped member of Figs. 3 and 4, is integral with the angularly disposed extension 39 of the clamp member 40. The free forward end of the support arm 38 may be turned upon itself as at 41, to encircle and embrace the part 21 of the basket or carrier. This construction furnishes no hinge action in the vicinity of the clamp, wherefor the connection at the lower end of the fork may be pivotal, and the support arm may be of somewhat flexible material so as to prevent a hinging movement of the clamp 40—42 about the handle bar. On bicycles having the conventional rigid fork construction there is no need to depend upon resiliency of the support arm, as the basket moves with the fork and the handle bar at all times. As is evident, the clamp structure at the handle bar may be identical in each instance, and in each instance, also, one of the clamp parts has an angularly disposed extension such as 31 of Fig. 3 and 39 of Fig. 6.

As will be understood, the basket mounting means will be duplicated at opposite sides of the steering post to effectively support the basket or carrier at two locations along the straight upper run 21 at the rear of the basket frame.

The character 43, Fig. 1, represents a metallic strap secured to the bottom of the basket or carrier, and furnishing suitable lugs for pivoting the braces 22 as at 23.

While the carrier and the mounting means herein disclosed are particularly adapted for use upon a bicycle or similar vehicle having a shock absorbing steering fork, they are nevertheless applicable to other and more common constructions. The handle bar clamp, of course, is subject to changes in proportions and in minor details for the accommodation of various types of handle bars, wherefor it should be understood that various modifications and changes in the structural details may be made within the scope of the appended claims without departing from the spirit of the invention.

What is claimed is:

1. A carrier for application to a cycle having a front wheel fork and a handle bar, said carrier comprising a basket having a bottom, side walls, and end walls, a circumferential frame element on the basket defining the top opening of the basket, said frame element having a rear straight portion of round stock to perform as a hinge element, a clamp attachable rigidly to the handle bar and including an integral elongated support arm offset from the clamp for disposition at a horizontal elevation different from the elevation of the handle bar, whereby reversal of the clamp upon the handle bar changes the elevation of said support arm, said support arm including a free end disposed remotely from the handle bar region, and a turned portion on said free end of the support arm providing a hinge eye substantially encircling and hinging upon the rear straight portion of the basket frame element, and upright means at the lower end of the fork for supporting the weight of the basket.

2. A carrier for application to a cycle having a resiliently supported front wheel fork and a handle bar, said carrier comprising a basket having a bottom, side walls, and end walls, a circumferential frame element on the basket defining the top opening of the basket, said frame element having a rear straight portion of round stock to perform as a hinge element, a clamp attachable rigidly to the handle bar and including an integral elongated support arm offset from the clamp for disposition at a horizontal elevation different from the elevation of the handle bar, whereby reversal of the clamp upon the handle bar changes the elevation of said support arm, said support arm including a free end disposed remotely from the handle bar region, and a turned portion on said free end of the support arm providing a hinge eye substantially encircling and hinging upon the rear straight portion of the basket frame element, and a pair of braces having opposite ends pivotally mounted upon the bottom of the basket and upon the lower end of the fork, to compensate for movements of the resiliently supported fork of the cycle during use.

EWALD F. PAWSAT.